(12) United States Patent
Tokumi

(10) Patent No.: US 8,103,743 B2
(45) Date of Patent: Jan. 24, 2012

(54) METHOD AND SYSTEM FOR ENABLING CLIENT-SIDE INITIATED DELIVERY OF DYNAMIC SECONDARY CONTENT

(75) Inventor: Roland Katsuaki Tokumi, Issaquah, WA (US)

(73) Assignee: Disney Enterprises, Inc., Burbank, CA (US)

( * ) Notice: Subject to any disclaimer, the term of this patent is extended or adjusted under 35 U.S.C. 154(b) by 236 days.

(21) Appl. No.: 12/214,517

(22) Filed: Jun. 18, 2008

(65) Prior Publication Data

US 2009/0319636 A1  Dec. 24, 2009

(51) Int. Cl.
*G06F 15/16* (2006.01)
(52) U.S. Cl. .................................... 709/218; 709/206
(58) Field of Classification Search .................. 709/206, 709/218, 230, 232, 246
See application file for complete search history.

(56) References Cited

U.S. PATENT DOCUMENTS

| | | | | |
|---|---|---|---|---|
| 6,892,226 B1 * | 5/2005 | Tso et al. | ....................... | 709/218 |
| 7,139,843 B1 * | 11/2006 | Brown et al. | .................. | 709/246 |
| 7,631,102 B2 * | 12/2009 | Bodwell et al. | ............... | 709/246 |
| 2004/0260767 A1 | 12/2004 | Kedem | | |
| 2005/0198353 A1 * | 9/2005 | Zmrzli | ........................ | 709/232 |
| 2006/0064350 A1 | 3/2006 | Freer | | |
| 2006/0288015 A1 * | 12/2006 | Schirripa et al. | ............. | 707/100 |
| 2007/0124399 A1 * | 5/2007 | Gillespie et al. | ............. | 709/206 |
| 2007/0255811 A1 * | 11/2007 | Pettit et al. | ..................... | 709/220 |
| 2007/0276952 A1 * | 11/2007 | Mitchell | ...................... | 709/230 |

* cited by examiner

*Primary Examiner* — Joseph Avellino
*Assistant Examiner* — Jeong S Park
(74) *Attorney, Agent, or Firm* — Farjami & Farjami LLP

(57) ABSTRACT

There is provided a method of enabling client-side initiated delivery of dynamic secondary content to a host page comprising running a dynamic secondary content delivery application, requesting a secondary content update to one or more items of existing secondary content rendered on the host page during page load, downloading the secondary content update to the client system, parsing the secondary content update by the dynamic secondary content delivery application, and rendering the secondary content update on the host page, resulting in the client-side initiated delivery of the dynamic secondary content to the host page. In one embodiment, the method is executed by a client system in response to instructions comprising the dynamic secondary content delivery application stored on a computer-readable medium.

9 Claims, 3 Drawing Sheets

METHOD AND SYSTEM FOR ENABLING CLIENT-SIDE INITIATED DELIVERY OF DYNAMIC SECONDARY CONTENT

BACKGROUND OF THE INVENTION

1. Field of the Invention

The present invention relates generally to the delivery of web content. More particularly, the present invention relates to the delivery of dynamic web content.

2. Background Art

The Internet, and packet networks in general, have become increasingly important sources of content for consumers seeking access to information and entertainment. The content available on an Internet website, for example, is typically presented to a consumer via one or more web pages, which may be loaded and displayed on a client device used by the consumer. Because, initially, the content provided on a web page took the form of relatively static data, the formatting and presentation protocols developed to facilitate information delivery were optimized for presentation of such data. Thus, a top-level page load of a selected host web page typically included data that determined and fixed rather precisely the content to be rendered and displayed to the consumer.

Determination of the content presented on a host page usually extended both to primary content, such as content comprising a central theme of the host page, and to secondary content, such as advertising content or other ancillary content associated with the primary content by, for example, the primary or secondary content provider. In order to update any content displayed on the page, a top-level page transition in the form of a reload of the original host page, was generally required. Moreover, access to additional content related to the primary content initially presented on the host page, but not included on the host page, typically required a top-level transition to another web page.

The sophistication of both consumers and the content providers utilizing packet networks has broadened substantially since the content delivery protocols geared to primarily static content were introduced, however. Today's savvy and increasingly demanding consumers desire access to frequently updated information, and have increasingly lofty expectations of the richness and immediacy of packet network provided content. Primary content providers, seeking to meet these enhanced consumer expectations, have found the conventional static format too constraining. As a result, much of the primary content presently being provided has been developed using formats more enabling of the dynamic, rich media experience preferred by consumers.

The evolution of primary content, from an almost exclusively static to an increasingly dynamic presentation format, has altered the way in which that content is substituted or updated. For example, whereas, in the past, updates to or substitution of primary content located on a presently loaded host page required reloading the page, or making a top-level transition to another page, that is no longer the case. Today, primary content is often dynamically delivered to a presently loaded host page without requiring a top-level page transition, be it a reload or navigation to a separate page. These changes to the manner in which primary content is delivered to a consumer interacting with a host page has given rise to unresolved challenges to providers of advertising and other forms of secondary content associated with the host page.

For example, one conventional approach to delivering secondary content, such as advertising content, has been to have predetermined secondary content load concurrently with primary content during top-level page load on the client system. Alternatively, another conventional approach delivers metadata concurrently with the primary content provided during top-level page load. That metadata may contain information instructing the client system to place a request for specific secondary content from a specific source, and directing the client system as to how to render the secondary content on the host page. Other conventional approaches may vary in the precise mechanism used to identify and request the secondary content accompanying a host page, but all of those conventional techniques typically operate only during top-level page transitions, or are triggered by those events.

Thus, conventional approaches have tied updates and substitutions to secondary content to top-level page transitions as a proxy for identifying updates and substitutions to primary content directly. Although those approaches may have been effective in keeping updates to secondary content in step with updates to primary content when the primary content was primarily static, they are no longer effective in doing so. Consequently, although, for example, advertisers have invested substantial resources in delivering the type of secondary advertising content identified as desirable to the consumers they seek to attract, by associating the secondary advertising content with primary content of interest to those consumers, that strategy may increasingly be rendered ineffective by the described changes to primary content delivery.

Accordingly, there is a need to overcome the drawbacks and deficiencies in the art by providing a more efficient solution enabling delivery of secondary content updates, in order to provide timely and topical secondary content to consumers.

SUMMARY OF THE INVENTION

A method and system for enabling client-side initiated delivery of dynamic secondary content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
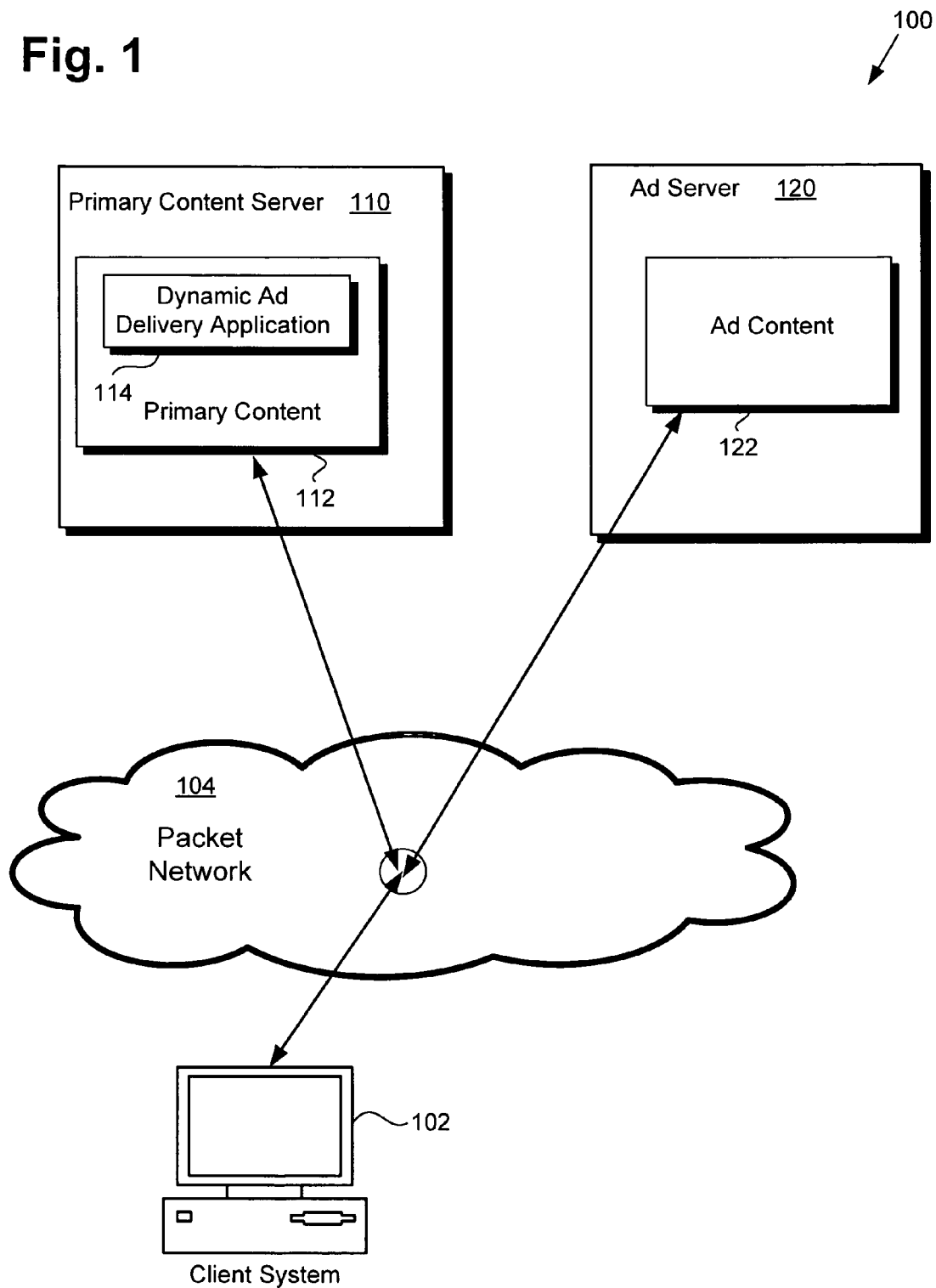
FIG. 1 shows a diagram of an exemplary system for enabling client-side initiated delivery of dynamic secondary content, according to one embodiment of the present invention.

The present application is directed to a method and system for enabling client-side initiated delivery of dynamic secondary content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a block diagram of an exemplary system for enabling client-side initiated delivery of dynamic secondary content to a host page, according to one embodiment of the present invention. In the embodiment of FIG. 1, system 100 comprises client system 102, primary content server 110 hosting primary content 112, which includes dynamic advertising ("ad") delivery application 114, and ad server 120 hosting ad content 122. Also shown in FIG. 1 is packet network 104.

Primary content 112 and ad content 122 may be stored as data files on respective primary content server 110 and ad server 120, for example. Primary content server 110 is configured to deliver a primary content host page to client system 102, and ad server 120 is configured to deliver ad content 122 for rendering on the host page. It is noted that although in the present embodiment, primary content 112 and ad content 122 are shown to reside on distinct servers, in one embodiment a single server comprises both primary content server 110 and ad server 120. Furthermore the specific characterization of ad content 122 as comprising advertising content is merely exemplary. More generally, ad content 122, in FIG. 1, corresponds to secondary content that may be associated with primary content 112 provided on the host page. Secondary content may include advertising content, such as ad content 122, or may comprise other forms of ancillary content, such as interactive user polls, navigation links, calendar dates, facts, or identifying labels, for example.

Primary content 112, which may comprise web content such as entertainment content, instructional content, or information content, for example, may be accessed by client system 102 through packet network 104, as shown in the embodiment of FIG. 1. Primary content 112 includes dynamic ad delivery application 114, which may comprise an embedded script on the host page providing primary content 112, for example. To emphasize the point made previously, in the more general sense, ad content 122 may comprise secondary content other than advertising content. In that more general case, dynamic ad delivery application 114 corresponds to a dynamic secondary content delivery application, which in one embodiment may be implemented utilizing an asynchronous JavaScript and XML ("AJAX") protocol.

Once accessed, primary content 112 including dynamic ad delivery application 114 may be delivered to client system 102 and stored on a computer-readable medium such as a computer hard drive (not shown in FIG. 1) or random access memory ("RAM") internal to client system 102, for example. Server-side delivery of primary content 112 to client system 102 may correspond to a top-level page load of the host page containing primary content 112, in a web browser of client system 102. Top-level page load of the host page typically includes rendering a preliminary set of secondary content associated with the primary content. In the embodiment of FIG. 1, for example, accessing primary content 112 on primary content server 110 results in a top-level page load of a host page including desired primary content 112, and an initial set of ad content 122 associated with the primary content.

Because secondary content, such as ad content 122, is typically provided only during a top-level page load or a top-level page transition from one web page to another in the conventional approach, dynamic changes to primary content 112 provided on the host page may not trigger corresponding updates to associated ad content 122. The present embodiment overcomes this deficiency in conventional solutions by providing a dynamic secondary content delivery application to initiate client-side delivery of dynamic secondary content updates corresponding to dynamic updating of the primary content provided on the host page. In the embodiment of FIG. 1, for example, dynamic ad delivery application 114 runs on client system 102, and is configured to request one or more ad updates to ad content 122 initially included on the host page. Dynamic ad delivery application 114 is further configured to mediate download of the ad updates from ad server 120 to client system 102, parse the ad updates, and render the ad updates on the host page, thus enabling client-side initiated delivery of the ad content to the host page.

In one embodiment, dynamic ad delivery application 114 generates a single comprehensive request to update all ad content located on the host page concurrently. This may be done to avoid conflict between any two displayed ads, such as ads by competing automakers delivered to a host page delivering primary content dedicated to travel on U.S. Route 66, for example. In another embodiment, conflicting ad content may be avoided despite updates being requested incrementally. In that embodiment, the request for one or more ad updates may include providing ad server 120 with data describing ad content previously rendered on the host page. It is noted that although client 102 is represented as a personal computer ("PC") in FIG. 1, in other embodiments client system 102 may comprise a mobile communication device such as a mobile telephone, a digital media player, a personal digital assistant ("PDA"), a wireless computer, a wireless gaming console, or a wired gaming console, for example.

Figure 2:
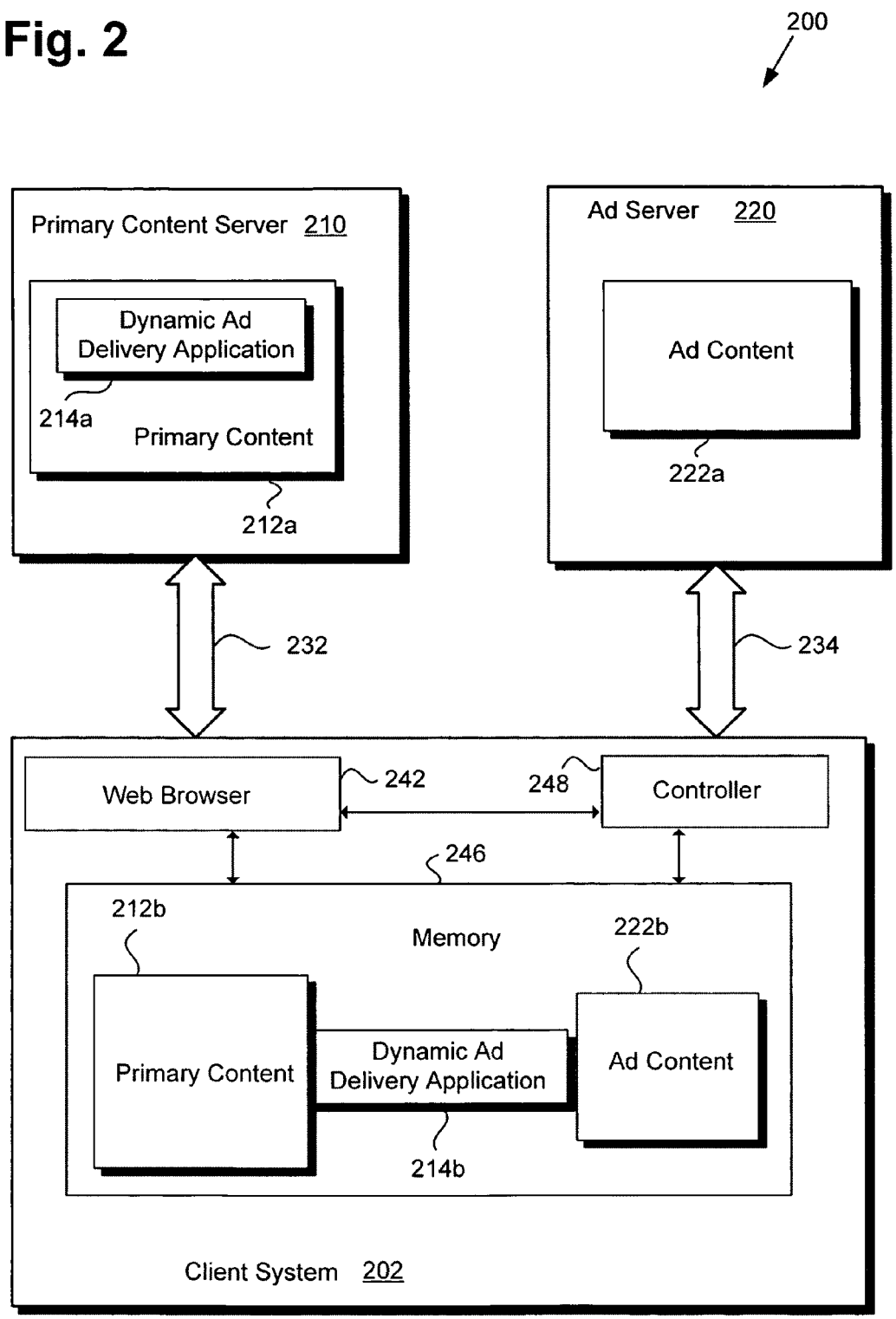
FIG. 2 shows a more detailed exemplary embodiment of a system for enabling client-side initiated delivery of dynamic secondary content.

Turning now to FIG. 2, FIG. 2 shows a more detailed exemplary embodiment of a system for enabling client-side initiated delivery of dynamic secondary content to a host page. System 200 in FIG. 2 includes client system 202 receiving data transfer 232 from primary content server 210 and data transfer 234 from ad server 220. Client system 202 corresponds to client system 102, in FIG. 1. As shown in FIG. 2, client system 202 comprises web browser 242, memory 246, and controller 248.

Primary content server 210 and ad server 220 correspond respectively to primary content server 110 and ad server 120 in system 100 of FIG. 1. As shown in FIG. 2, primary content server 210 includes primary content 212*a* and dynamic ad delivery application 214*a*, corresponding respectively to primary content 112 and dynamic ad delivery application 114, in FIG. 1. Moreover, ad content 222*a* located in ad server 220 of FIG. 2, corresponds to ad content 122, in FIG. 1. As in FIG. 1, although the embodiment of FIG. 2 shows multiple servers, in another embodiment a single server can comprise primary content server 210 and ad server 210. In addition, and again as in FIG. 1, ad content 222*a* and dynamic ad delivery application 214*a* correspond, in the more general case, to secondary content and a dynamic secondary content delivery application, respectively.

Also shown in FIG. 2 are primary content 212*b*, dynamic ad delivery application 214*b*, and ad content 222*b*. In the present embodiment, primary content 212*b*, dynamic ad delivery application 214*b*, and ad content 222*b* are located in memory 246, having been received from primary content server 210 and ad server 220 via respective data transfers 232 and 234. In one embodiment, data transfers 232 and 234 correspond to download of primary content 212a, dynamic ad delivery application 214a, and ad content 222a over a packet network, for example. Once transferred, the various content components, including primary content 212b, dynamic ad delivery application 214b, and ad content 222b may be stored in local memory 246 and run locally on client system 202.

Alternatively, primary content 212a and dynamic ad delivery application 214a can reside on a computer-readable medium compatible with client system 202. For example, instructions comprising dynamic ad delivery application 214a which, when executed by client system 202, perform a method for enabling client-side initiated delivery of ad content may reside on the computer-readable medium. The method performed in response to the computer-readable medium stored instructions may include requesting one or more ad updates, downloading the ad updates to client system 202, parsing the ad updates, and rendering the ad updates on the host page.

The expression "computer-readable medium," as used in the present application, refers to any medium that provides instructions to controller 248 of client system 202. Thus, a computer-readable medium may correspond to various types of media, such as volatile media, non-volatile media, and transmission media, for example. Volatile media may include dynamic memory, such as dynamic RAM, while non-volatile memory may include optical, magnetic, or electrostatic storage devices. Transmission media may include coaxial cable, copper wire, or fiber optics, for example, or may take the form of acoustic or electromagnetic waves, such as those generated through radio frequency ("RF") and infrared ("IR") communications. Common forms of computer-readable media include, for example, a compact disc read-only memory ("CD-ROM"), digital video disc ("DVD"), or other optical disc; a RAM, programmable read-only memory ("PROM"), erasable PROM ("EPROM), FLASH memory, or a transmission carrier wave.

Controller 248 may be the central processing unit for client system 202, for example, in which role controller 248 runs the client operating system, launches web browser 242, and facilitates presentation of primary content 212b and ad content 222b. Web browser 242, under the control of controller 248, may execute dynamic ad delivery application 214b to render ad content 222b on the host page providing primary content 212b.

As shown in FIG. 2, when executed by client system 202, dynamic ad delivery application 214b mediates delivery and rendering of ad updates requested from ad server 220. In the present embodiment, dynamic ad delivery application 214b enables client-side delivery of dynamic ad content in the absence of top-level page transitions during display of primary content 212b. As a result, secondary content, such as ad content 222b, can be regularly updated in response to client-side requests generated by dynamic ad delivery application 214b, so as to remain timely and topical with respect to dynamically updated primary content displayed on the same host page.

The operation of system 200 will now be described in conjunction with FIG. 3, which presents a method of enabling client-side initiated delivery of dynamic secondary content, according to one embodiment of the present invention. Certain details and features have been left out of flowchart 300 that are apparent to a person of ordinary skill in the art. For example, a step may consist of one or more substeps or may involve specialized equipment or materials, as known in the art. While steps 310 through 360 indicated in flowchart 300 are sufficient to describe one embodiment of the present method, other embodiments may utilize steps different from those shown in flowchart 300, or may include more, or fewer steps.

Figure 3:
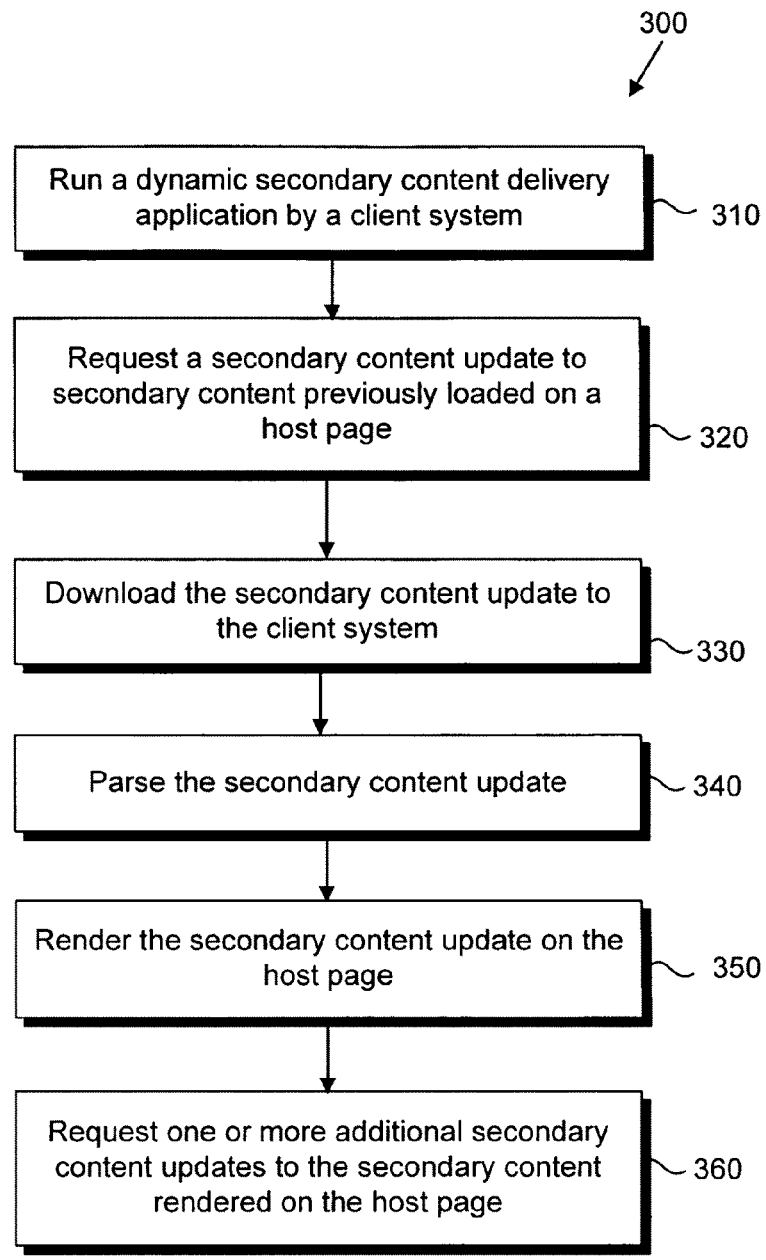
FIG. 3 is a flowchart presenting a method for enabling client-side initiated delivery of dynamic secondary content, according to one embodiment of the present invention.

Starting with step 310 in FIG. 3 and system 200 in FIG. 2, step 310 of flowchart 300 comprises running a dynamic secondary content delivery application by a client system. Step 310 corresponds to running dynamic ad delivery application 214b by client system 202, in FIG. 2. As shown and described in combination with FIG. 2, a user of client system 202 may choose to access primary content 212a hosted on primary content server 210, such as an Internet website, for example. Primary content 212a, which includes dynamic ad delivery application 214a, may be transferred to client system 202 via data transfer 232, and be loaded in web browser 242 as primary content 212b, in the form of a host page. Top-level loading of the host page will render primary content 212b, and cause a preliminary set of ad content 222b to be rendered as well.

Dynamic ad delivery application 214b, which can comprise an embedded script on the host page providing primary content 212b, is run in step 310 of flowchart 300, to mediate and manage delivery of dynamic ad content to the host page, in order to provide dynamic updates to the ad content rendered at page load. As previously described, in one embodiment, dynamic ad delivery application 214b may be implemented using asynchronous techniques, such as AJAX protocols, to render the secondary content updates effectively independent of, and consequently non-disruptive to, the primary content displayed on the host page.

The exemplary method of flowchart 300 continues with step 320, which comprises requesting a secondary content update to one or more items of existing secondary content rendered on the host page during page load on the client system. Step 320 corresponds to the operation of client system 202 in response to instructions provided by dynamic ad delivery application 214b, to request updates to the preliminary advertising content rendered to correspond with top-level page load of the host page providing primary content 212b. In one embodiment, dynamic ad delivery application 214b may cause client system 202 to request ad updates automatically, after lapse of a predetermined time period after top-level page load, such as every five to ten seconds later, for example. In other embodiments, requests for ad updates may correspond to delivery of dynamic primary content to the host page, so that ad content updates are triggered by, for example, the instantiation of a new impression of the primary content on the host page, even where a top-level page transition has not occurred.

In some embodiments, dynamic ad delivery application 214b may cause client system 202 to request updates to all ad content located on the host page concurrently, for example to avoid conflict amongst the ad updates. In other embodiments, however, ad delivery application 214b may cause client system 202 to request incremental updates, so that only a portion of the ad content located on the host page is updated at one time. In those latter embodiments, step 320 may include providing ad content server 220 with data describing ad content 222b previously rendered on the host page in conjunction with primary content 212b.

Flowchart 300 continues with step 330, in which the secondary content update requested in step 320 is downloaded to the client system. For example, in the embodiment of FIG. 2, new ad content 222a is downloaded from ad server 220 to client system 202 over data transfer 234 to provide ad updates to ad content 222b. Then, in step 340, the ad updates are parsed by dynamic ad delivery application 214b.

The ad content, or more generally, the secondary content rendered on the host page, may be representative of more than one type of content container. For example, ad content may be characterized by the type of container in which the advertisement is introduced on the host page. Container types, such as <div> containers and <iframe> containers require that their respective contents be inserted differently. Thus, in one embodiment, parsing the ad updates by dynamic ad delivery application 214b in step 340, may comprise distinguishing ad updates destined for <div> containers from those directed to <iframe> containers, in order to implement the appropriate logic operations for their respective insertions.

The exemplary method of flowchart 300 continues with step 350, which comprises rendering the secondary content update on the host page, resulting in the client-side initiated delivery of the dynamic secondary content to the host page. As previously mentioned, the method of flowchart 300 may be implemented using asynchronous techniques, so that rendering step 350 may be performed without disruption to primary content 212b being delivered by the host page.

Depending upon the length of time that the host page is displayed, or the rate at which primary content 212b is dynamically updated on the host page, one, or several more secondary content updates may be requested in step 360, for the same top-level host page load. In those instances, steps 320 through 350 may be repeated as frequently as desired. For example, where dynamic ad delivery application 214b instructs client system 202 to request ad updates from ad server 220 every ten seconds, a host page that provides dynamically updated primary content so that it does not undergo a top-level page transition for more than one minute, may result in five or more iterations of steps 310 through 350.

Thus, the present application discloses a method and system for enabling client-side initiated delivery of dynamic secondary content. By providing a dynamic secondary content delivery application running as a script on a host page, one embodiment of the present invention enables delivery of secondary content updates corresponding to dynamic updating to primary content displayed on the page. By triggering requests for secondary content updates to a host page display interval, one embodiment of the present invention enables client-side initiated requests for delivery of dynamic secondary content independently of top-level page transitions of the host page. Moreover, by utilizing asynchronous programming techniques to implement the dynamic secondary content delivery application, the present application describes a solution providing users with timely and topical secondary content, without disruption to the primary content sought by the user and delivered by the host page.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of enabling client-side initiated delivery of dynamic ads to a host page, the method comprising:

running a dynamic ad delivery application by a client system;

generating a single request for ad updates to a plurality of items of existing ads rendered on the host page during page load on the client system, wherein the ad updates in the single request have no conflicting ads;

downloading the ad updates to the client system;

parsing the ad updates by the dynamic ad delivery application, wherein the ad updates to the plurality of items of existing ads includes a first update to a first item of the plurality of items belonging to a first container type and a second update to a second item of the plurality of items belonging to a second container type, and wherein the parsing includes distinguishing between the first update and the second update having the first container type and the second container type, respectively; and rendering the ad updates on the host page having, a primary content as a central theme, resulting in the client-side initiated delivery of the dynamic ad to the host page for advertisement in conjunction with providing the central theme.

2. The method of claim 1, wherein the dynamic ad delivery application comprises an embedded script on the host page.

3. The method of claim 1, wherein the single request includes providing an ad server with data describing all of the plurality of items of existing ads presently rendered on the host page.

4. The method of claim 1, wherein the rendering of the ad updates on the host page occurs independent of and without disruption of the primary content displayed on the host page.

5. A system for enabling client-side initiated delivery of dynamic ads to a host page, the system comprising:

a primary content server for delivering the host page to a client system, the host page configured to include a primary content as a central theme of the host page and ads for advertisement in conjunction with providing the central theme;

an ad server configured to provide the ads for rendering on the host page; and a dynamic ad delivery application to be run on the client system, the dynamic ad delivery application configured to generate a single request for ad updates to a plurality of items of the ads rendered on the host page, wherein the ad updates in the single request have no conflicting ads, the dynamic ad delivery application configured to download the ad updates from the content ad server to the client system, parse the ad updates, and render the ad updates on the host page, to enable client-side initiated delivery of the dynamic ad to the host page;

wherein the ad updates to the plurality of items of the ads includes a first update to a first item of the plurality of items belonging to a first container type and a second update to a second item of the plurality of items belonging to a second container type, and wherein the parsing includes distinguishing between the first update and the second update having the first container type and the second container type, respectively.

6. The system of claim 5, wherein the dynamic ad delivery application comprises an embedded script on the host page.

7. The system of claim 5, wherein a single server comprises the primary content server and the ad server.

8. The system of claim 5, wherein the single request for the ad updates includes providing the ad server with data describing all of the plurality of items of existing ads presently rendered on the host page.

9. The system of claim 5, wherein rendering of the ad updates on the host page occurs independent of and without disruption of the primary content displayed on the host page.

* * * * *